1,196,604.
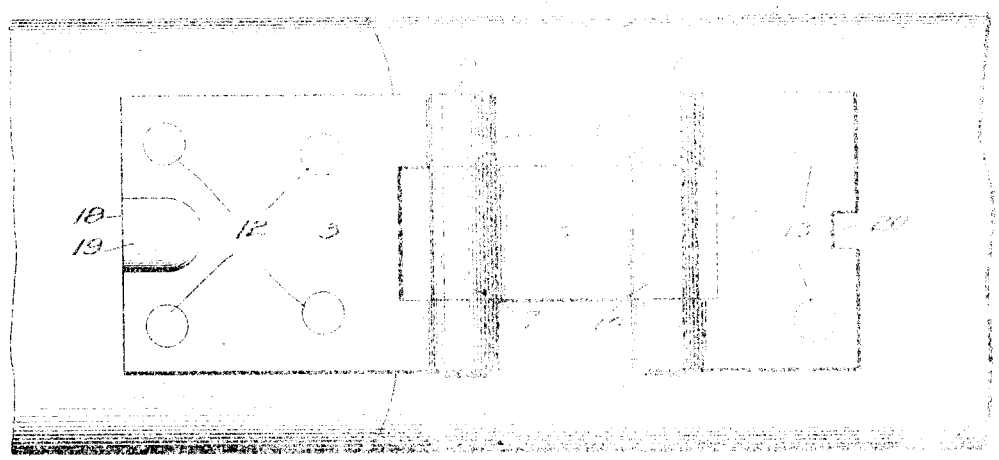
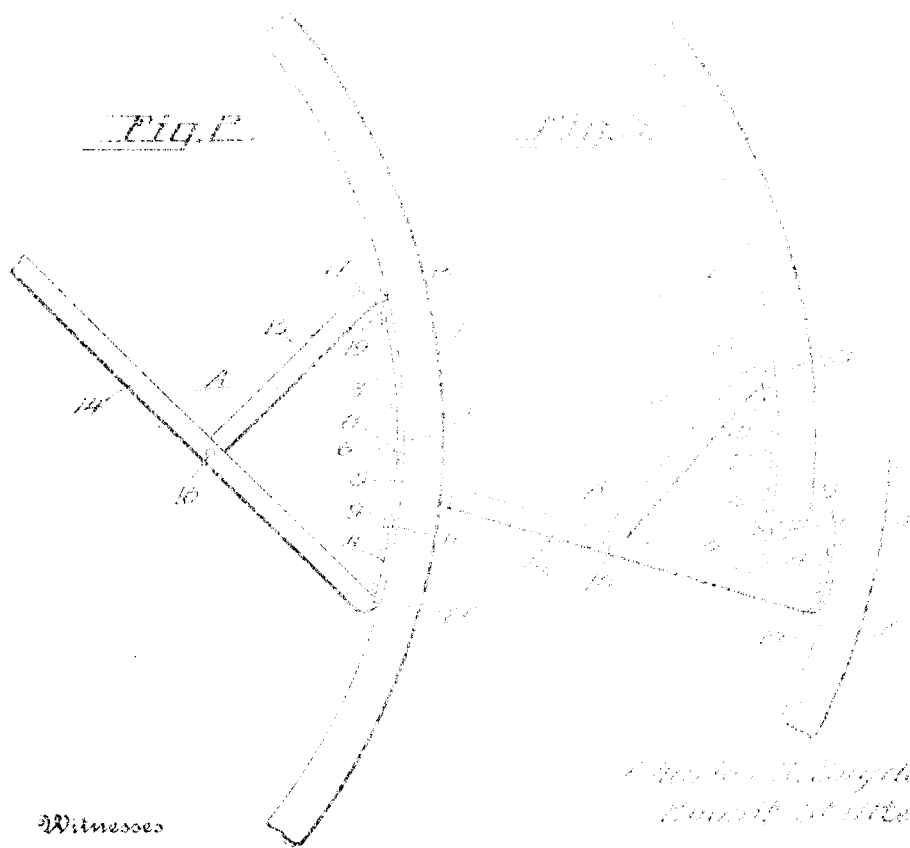

UNITED STATES PATENT OFFICE.

CHARLES H. SNYDER AND EMMIT STALLTER, OF ROCKFORD, OHIO.

VEHICLE-WHEEL RIM.

1,196,604.  Specification of Letters Patent.  Patented Aug. 29, 1916.

Application filed May 8, 1915. Serial No. 26,856.

*To all whom it may concern:*

Be it known that we, CHARLES H. SNYDER and EMMIT STALLTER, citizens of the United States, residing at Rockford, in the county of Mercer and State of Ohio, have invented new and useful Improvements in Vehicle-Wheel Rims, of which the following is a specification.

This invention relates to vehicle wheel rims, the object in view being to provide a tire holding rim which is collapsible to an extent sufficient to enable a pneumatic tire to be readily applied thereto and removed therefrom, without disconnecting the extremities of the rim or the parts by which the extremities of the rim are coupled together.

With the above and other objects in view, the invention consists in the novel construction, combination and arrangement of parts, as herein described, illustrated and claimed.

In the accompanying drawings:—Figure 1 is a plan view looking toward the inside face of a tire holding rim, illustrating the form of joint and connections between the extremities of the rim which is of the split variety. Fig. 2 is a fragmentary edge view of the rim with the extremities thereof in line with each other. Fig. 3 is a similar view showing the position assumed by the extremities of the rim when contracted to admit of the removal of a tire or the placing of a tire thereon.

1 designates a tire carrying rim such as is now commonly employed as a demountable rim for the wheels of automobiles and the like, with the exception that the rim of this invention is split or cut in two at a single point as indicated at 2, the split being slightly oblique as shown in each of the views in order to enable the extremities of the rim adjacent to the split to come close together when the rim is in its normal tire carrying condition as shown in Figs. 1 and 2.

The free extremities of the rim are coupled together by means of a three part hinge or, in other words, a hinge comprising three leaves or members 3, 4 and 5, the members 3 and 5 being provided with knuckles 6 and 7 through which is inserted a hinge pin 8, and the members 4 and 5 being likewise provided with knuckles 9 and 10 through which is inserted a hinge pin 11. The leaf or member 3 is riveted or otherwise firmly attached to one of the extremities of the rim as shown at 12 and the member 4 is in a like manner secured to the other extremity of the rim as shown at 13. The member 3 projects beyond the end of the rim to which it is secured as shown in Figs. 2 and 3 while the member 4 terminates short of the extremities of the rim as shown in the same figures, the member 5 serving in the capacity of a connecting link for the members 3 and 4 to permit the free extremities of the rim 1 to be moved out of line with each other as shown in Fig. 3 and returned into line with each other as shown in Fig. 2.

In order to facilitate the contraction and subsequent expansion of the rim 1, we employ a device similar to a cant hook lever designated generally at A and comprising the longer arm or lever 14 and the shorter arm 15 pivotally connected to the lever 14 at 16 and provided at its free end with a hook 17 which is adapted to be inserted into an undercut socket 18 formed in the member 3 by providing said member with a raised hollow boss 19. The other member 4 is provided with a notch 20 to receive the extremity of the lever 14. The operating device is associated with the rim 1 in the manner illustrated in Fig. 2 and then by moving the lever in the proper direction, the hooked extremity of the arm 15 draws the adjacent extremity of the rim inwardly with respect to the other extremity of the rim and at the same time lengthwise of the rim until the two extremities of the rim are brought into the relative position illustrated in Fig. 3. In such position the rim is sufficiently contracted in size to admit of a tire being removed therefrom or placed thereon. After the tire has been replaced on the rim, the rim is expanded by forcing the free extremities thereof into line with each other as shown in Fig. 1.

What we claim is:—

1. A tire carrying rim for vehicle wheels, said rim being split at one point, and a three-part hinge consisting of two end members and a connecting member or link pivotally attached to the end members, said end members being fixedly secured to the end portions of the rim adjacent to the split, one of said end members being formed with an undercut hook-receiving socket in the end thereof farthest from the split for the purpose specified.

2. A tire carrying rim for vehicle wheels, said rim being split at one point, and a three-part hinge consisting of two end members and a connecting member or link pivotally attached to the end members, said end members being fixedly secured to the end portions of the rim, adjacent to the split, one of said end members being formed with an undercut hook-receiving socket in the end thereof farthest from the split and the other end member with a notch for the purpose specified.

In testimony whereof we affix our signatures in presence of two witnesses.

CHARLES H. SNYDER.
EMMIT STALLTER.

Witnesses:
E. E. JACKSON,
CALVIN JACKSON.